(No Model.) 3 Sheets—Sheet 3.
A. BLATCHLY.
DRIER.
No. 519,694. Patented May 15, 1894.
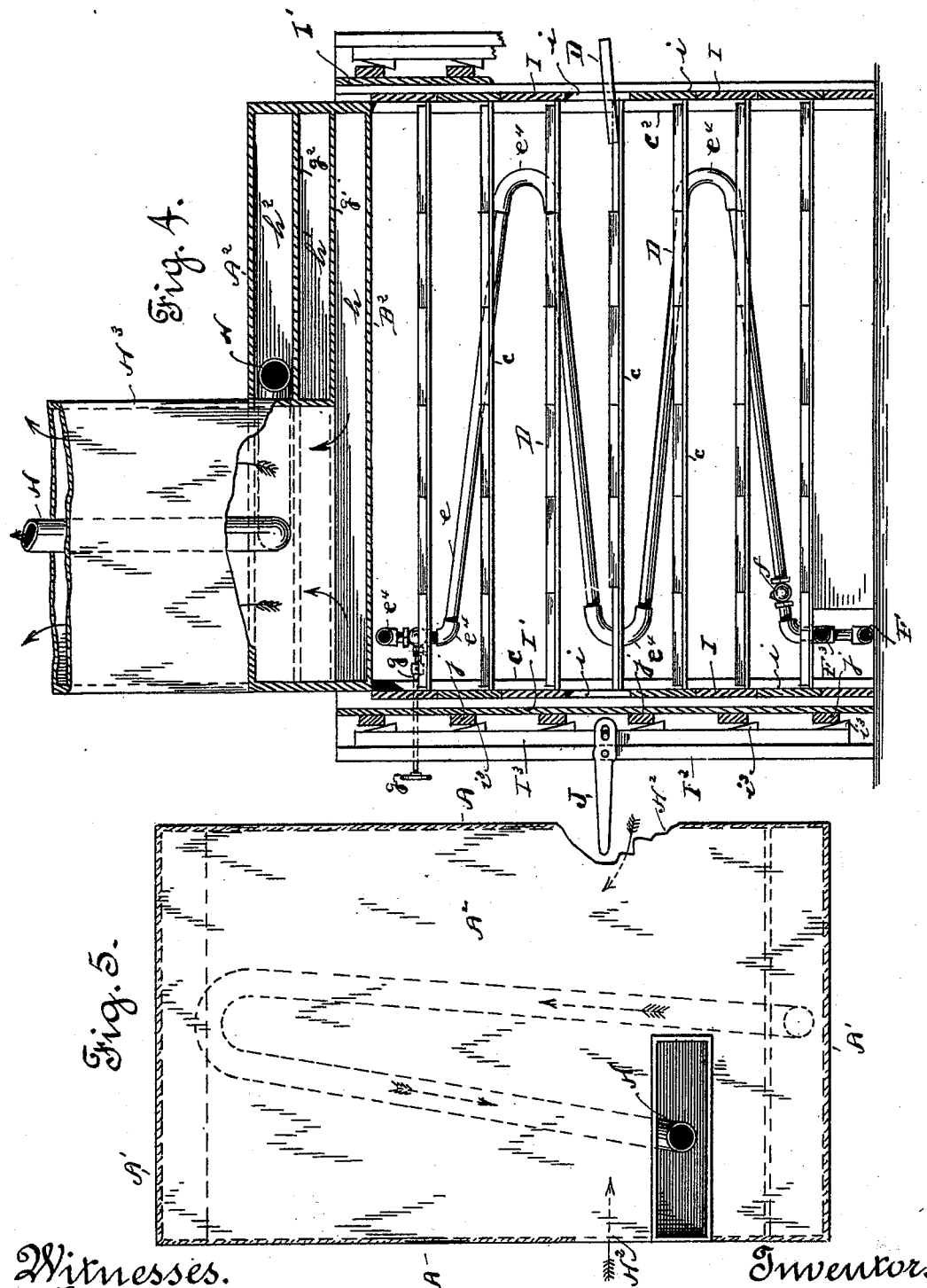

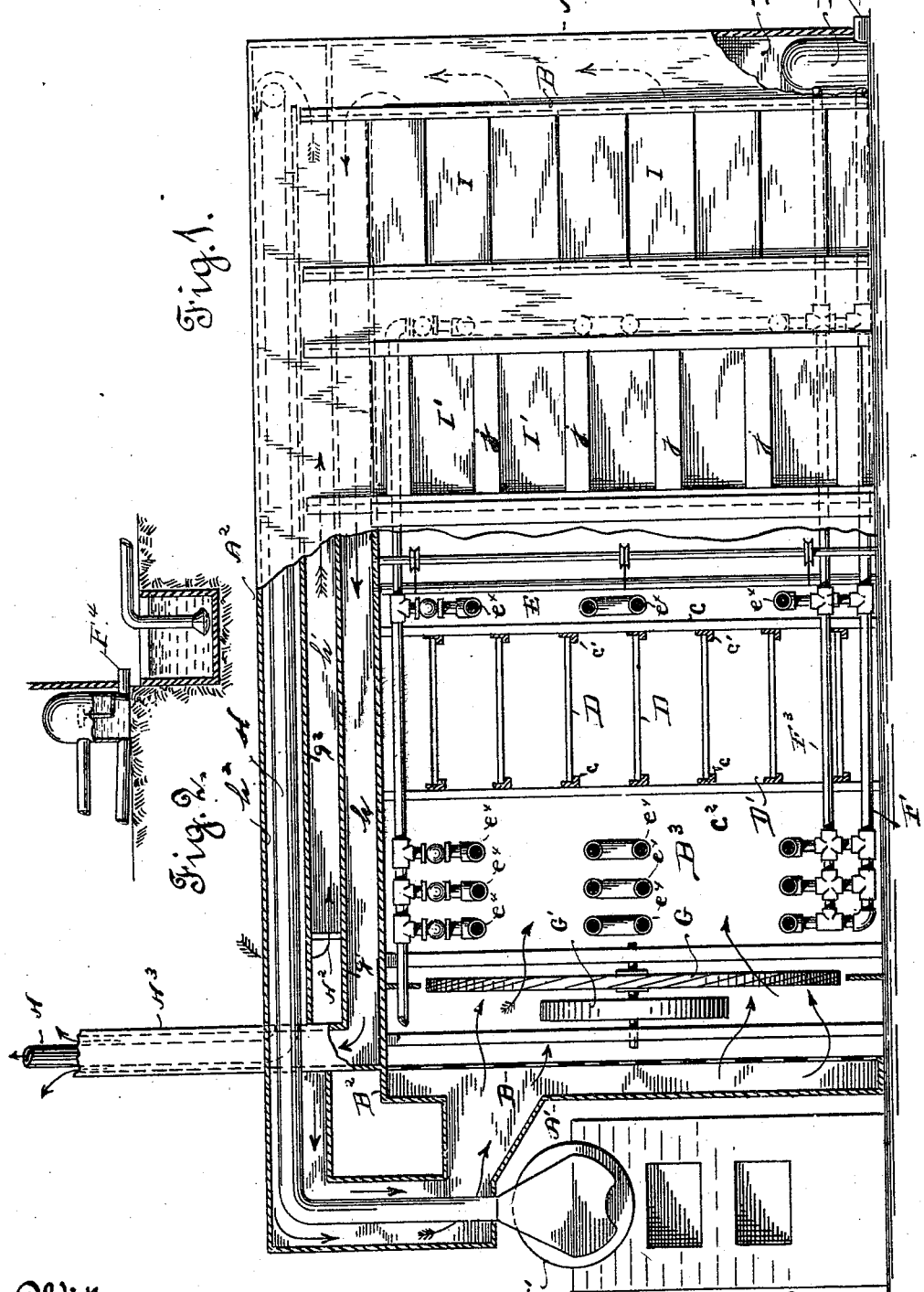

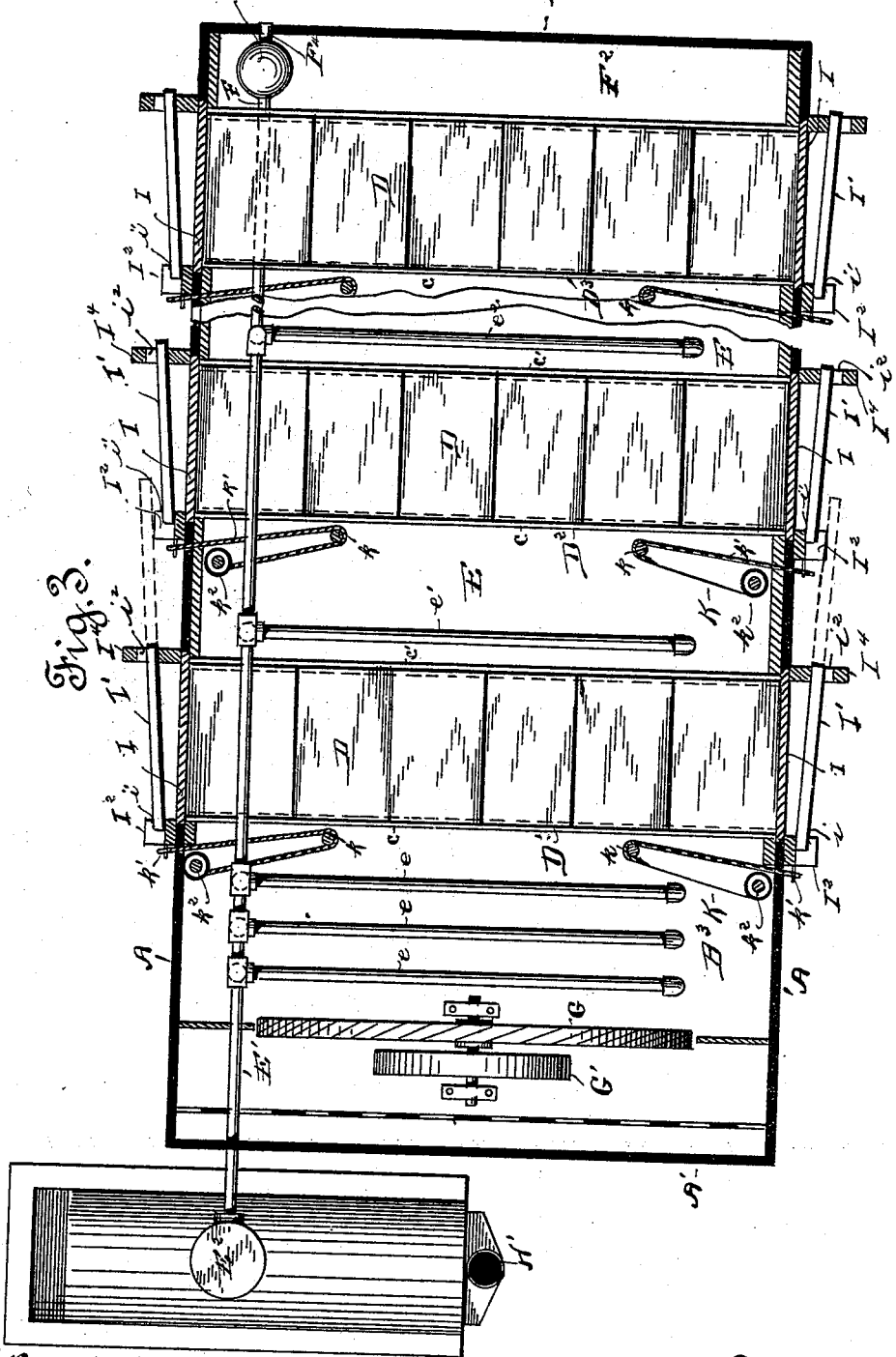

UNITED STATES PATENT OFFICE.

AMBROSE BLATCHLY, OF SAN FRANCISCO, CALIFORNIA.

DRIER.

SPECIFICATION forming part of Letters Patent No. 519,694, dated May 15, 1894.

Application filed January 23, 1892. Serial No. 418,984. (No model.)

*To all whom it may concern:*

Be it known that I, AMBROSE BLATCHLY, a citizen of the United States, residing at San Francisco, in the county of San Francisco and State of California, have invented certain new and useful Improvements in Driers; and I do hereby declare the following to be a full, clear, and exact description of said invention, such as will enable others skilled in the art to which it most nearly appertains to make, use, and practice the same.

My invention has relation to certain new and useful improvements in fruit driers, which consists in the arrangement of parts and details of construction as will be hereinafter more fully set forth in the drawings, described and pointed out in the specification.

Referring to the drawings forming a part of this application, wherein similar letters of reference are used to denote corresponding parts throughout the entire specification and several views—Figure 1, is a side elevation of the drier, partly broken away in order to more fully show arrangement of supply flues and drying chamber; Fig. 2 detail of the steam pipe and trap; Fig. 3 longitudinal cross sectional top plan view of the apparatus; Fig. 4 cross sectional vertical view; and Fig. 5 a top plan of the drier.

The letters A, A', are used to indicate the outer side and end walls of the drier, built upon suitable flooring and provided with cover $A^2$. Within the chamber or frame thus formed is located the drying chamber, which consists of the open ends B, B', and top $B^2$. To the walls of the drying chamber $B^3$, are secured the vertical pieces C, $C^2$, to which are fastened cross guide pieces or strips c, c'. These guides are fastened an equal distance apart and form distinct tiers into which the filled fruit trays D, slide. It will be noticed that I build a series of portions or fruit sections, D', $D^2$, $D^3$, Fig. 3. The space E, intermediate the tiers is designed to permit operators moving therebetween in order to look after and regulate the heating mechanism, hereinafter set forth, thus forming passage ways within the drying chamber between the fruit drying sections. Near the top of the drying chamber is secured and runs the steam heating pipe E', which leads from steam supply $E^2$, located outside the drier and runs within said chamber to the last passage way. To this pipe is secured and connected a series of branch carrying pipes e, e', $e^2$, which run from side to side of drying chamber gradually extending downward until bottom of said chamber is reached. The ends of these pipes are secured by couplings $e^4$, Fig. 4. When the bottom of drying chamber is reached, the steam circulating pipes connect by means of cross-joints to waste pipe F, which runs longitudinally within chamber $B^3$, and discharges into steam trap F', secured within lower portion of chamber $F^2$, which steam trap or dome is provided with the usual check valve. In order to prevent accumulation of steam within the dome or steam trap, which might possibly serve to cause a back pressure in the waste pipe, I provide the return pipe $F^3$, which runs from the upper portion of the steam trap or dome and the entire length of the waste pipe and connects thereto, as shown. The steam as accumulated in the steam dome or trap flows into the return or circulation pipe $F^3$, and from thence into waste pipe F, thus undue pressure in steam trap is obviated. This steam dome being of ordinary construction calls for no specific description herein. Into this dome or trap, end of waste pipe projects so as to discharge waste water therein, from whence same is conveyed by outlet pipe $F^4$.

The providing of check valves f, see Fig. 4 within the circulating coils allows or permits me to entirely shut off flow of steam through any one coil when desired to lower temperature thereof. The usual construction of connecting the circulating coils to the waste pipe, without providing a return pipe for carrying off and preventing accumulation of steam in dome of trap, allows the pressure of steam in the dome of trap to increase and cause the waste water to back within waste pipe and prevents circulation of steam within the circulating coils, thus lowering temperature within all the coils and interfering with proper heating of drying chamber.

The water exhausted from steam trap may be conveyed back to the boiler in the usual manner for re-utilization, or for other purposes. The branch heat circulating pipes e, e', $e^2$, run within the passage ways between fruit sections or tiers, as shown in Figs. 1 and 3. Within forward portion of the drying chamber B³, is located and works fan wheel G, which is operated by wheel G', rotating through the medium of any suitable mechanism. The rotation of fan wheel G, serves to draw the heated air from supply flue and through perforated end B, into drying chamber B³, and distribute same therein, the current or suction caused by fan wheel G, serving to force the heated air the entire length of the chamber, during the travel of which it is forced between fruit tiers in order to extract moisture from the fruit and is discharged into end chamber F², from whence it is carried off as will be hereinafter more fully explained. Within the forward end of drying chamber I locate a greater number of heat circulating pipes than within lower passage ways, for the reason that the inflowing air requires greater heat in order to raise it to proper temperature, and inasmuch as the heated air travels throughout the entire chamber it is obvious that less heat is required during its travel to maintain a uniform temperature thereof; consequently when discharge chamber F², is reached the temperature of drying chamber will be even throughout its length. As the heated air receives or absorbs moisture from fruit contained in first section, the heated air circulation within second passage way serves to even or raise the temperature thereof, and so throughout the entire chamber. The steam circulating pipes are each provided with operating valves $g$, the opening or closing of either of which controls flow of steam from supply pipe E', in that coil. If the fruit placed in, say section D³, is very moist, it is necessary that same be subjected to higher temperature, in order to allow for absorption of moisture as quickly as takes place in the other sections, consequently in order to raise the temperature thereof, operating valve controlling supply of heat to circulation coil is opened so as to admit more steam thereto. By these valves the temperature of heat in any given coil may be raised so as to compensate for lowered temperature of traveling heated air, due to becoming filled with moisture while passing over the fruit, or other cause.

The space intermediate drier top A², and chamber top B², is divided by horizontal partitions $g'$, $g^2$, into chambers or flues $h$, $h'$ $h^2$. Within chamber $h^2$, circulates the smoke flue or pipe H, which carries the smoke and products of combustion from furnace H', upwardly and thence through the entire length of the chamber $h^2$, whence the smoke flue returns and retravels the length of said chamber and is finally discharged as shown in Fig. 1, while run of said flue is shown in Fig. 5. Openings H², are formed in each side of chamber $h$, near the forward end, through which fresh air enters and is admitted to the said chamber. The fresh air entering circulates within chamber $h'$, and is heated by the moist air passing under partition $g'$. The air enters the chamber and travels the full length thereof extracting all practicable heat from chamber $h$, and thence passes upward into communicating chamber $h^2$, and is further heated by flue H, carrying off the heated products of combustion, and traveling the full length of said flue is finally discharged through perforated end B, into the drying chamber, wherein it is forced to travel and circulate by action of fan wheel G. After the heated air has circulated over and between the fruit trays, absorbing during its travel all practicable moisture from the fruit, it is discharged into chamber F², from whence it enters into top chamber $h$, and is discharged into exit flue H³, which surrounds the smoke flue. By surrounding the escape flue for products of combustion, by exit flue H³, the same is kept in a heated condition its entire length, thus giving greater heat to chamber or flue $h$, while at the same time the hot products of combustion serve to impart a higher temperature to escaping moist air; thus maintaining flue $h^2$, always heated, which serves to impart heat to the cold air immediately upon its entrance into chamber $h'$, and also increase draft in each. It will thus be seen that the fresh air enters the drier at almost the same point as the one at which the moist used air is discharged and that it travels just above the waste air for a considerable distance in a direction contrary thereto so as to extract heat therefrom. It then passes over and around the smoke flue toward the furnace so that by the time it enters the drying chamber it has been raised to a very high temperature.

In order that all practicable heat contained in the outflowing moist air may be absorbed by the inflowing air, I construct the partition $g'$, of metal. By introducing the fresh air and discharging utilized air at the same portion of the apparatus, I provide for the utilization of all practical heat traveling within the apparatus. This is an important feature of the drier, inasmuch as I am enabled to utilize a greater heat from a given amount of fuel, thus cheapening the expense attached to the running thereof.

To the drying chamber I provide an inner and an outer door to each fruit drying section. The inner door consists of a series of vertically sliding panels I, which work in guide ways $i$, and rest one upon the other, as shown fully, Fig. 4. Each panel is equal in height to the distance between the fruit drying trays and by lifting one all thereabove are raised. These slides fall by gravity and bear firmly upon each other. The outer door I', is made solid and slides horizontally at an incline, Fig. 3, and when closed, inner edge fits closely within groove $i'$, formed in jamb I². The outer portion works in slot or opening $i^2$, in jamb I⁴, as the door is moved backward. However in order to hold the door tightly closed, when moved forward, so as to prevent escape of heat, I provide the vertically sliding rod I³, which is provided with wedge shaped cleats i³, which work within opening i², and bear or press firmly, when the rod is raised, against cross strips j, secured to the sliding door. This rod is raised or lowered by means of vertically swinging lever or handle J, which is pivoted to jamb I², Fig. 4. In order to remove and replace fruit trays, vertical sliding rods are moved downward so as to release doors I, which are then moved backward at an incline. The inner doors or panels I, are then lifted or raised vertically, and operator on one side of the drier slides in a fresh tray of fruit, while operator on the other side removes the outwardly traveling one, which is continued in this manner until all dried fruit or trays are removed and fresh fruit substituted. In Fig. 4, I show fresh tray D, being placed within the drier. As one layer of dried fruit is removed and is replaced by fresh fruit, one of the sliding panels on each side of the drying chamber is dropped, which leaves the next layer exposed, and so on until all the trays containing dried fruit have been removed from the chamber and fresh fruit inserted in a similar manner. It will thus be seen that the drying chamber is always filled with fruit, and no fruit is removed from the drying chamber partly dried, and then replaced for drying, as is the case where the entire layer is removed at one time, or by means of cars.

In order to protect face of operator from the effects of the traveling heat or hot air, I provide a series of shields or protectors K, which work upon rolls k. The shields or deflectors are moved in or out by means of cords or ropes k'. When the doors are opened, cords k', are pulled outward and aprons, shields or protectors are unrolled from roll k², which shields then assuming position shown in Fig. 3. The shields on the opposite side of the drying chamber are shown as rolled upon spring roll k². When the shields are unrolled the heat is deflected toward center of drying chamber and thus serves to maintain same out of line of operator's face. When the doors are closed the shields, which by preference are constructed of cloth, are allowed to remain wound upon spring roll k².

In order to allow for drying of fruit required to receive first a high temperature and thence a gradually lowering one, which is the case with all deciduous fruits, and of such as require first introduction to a low temperature and thence a gradually increasing one, I run cross branch pipe e, only a portion of the entire distance of passage way E, thus exposing current of air to one side of the drying chamber to a larger heating surface than the other. The relative position of the pipes is shown in Fig. 3. In case it is required to dry such fruit as peaches, the trays containing same are introduced first into side L, and are gradually moved to side L', of the chamber, inasmuch as deciduous fruits require first a high or quick drying temperature; while in case I desire to dry raisins, &c., the trays containing same are introduced first into side L', and gradually moved to side L.

When it is required to maintain a greater temperature to one side than is accomplished by the running of the radiating coils, I set the deflectors at an angle as shown in Fig. 3, thus forcing or causing the traveling air to be thrown to the opposite side of the chamber. Ordinarily the arrangement of radiating coils will serve to create sufficient difference of temperature, but frequently it happens that the temperature of one side must be materially increased, in which case the deflectors are employed. The supply and drain pipes being secured to side L, of the chamber tends to give an increased temperature thereto, in addition to arrangement of radiating coils.

I am aware that minor changes may be made in the arrangement of parts and details of construction herein shown and described without necessitating a departure from the nature and scope of my invention.

Having thus fully described my invention, what I claim as new, and desire to secure protection in by Letters Patent of the United States, is—

1. In a drying apparatus, the combination with the drying chamber, of the fruit sections located therein, the guideways formed in the walls of the fruit sections, said guide ways arranged cross-wise of the fruit sections, the fruit-holding trays, said trays adapted to fit within the guide-ways and to be moved cross-wise of the longitudinally traveling heat through the drier and be removed on the side opposite their entrance, and the doors for closing the ends of the fruit sections, said doors consisting of a series of independent slats arranged one above the other so as to be moved vertically, each slat being designed to cover one of the fruit passage-ways.

2. The combination with the drying chamber, of the transverse fruit-holding sections located therein with passage ways between them, a longitudinal heating pipe arranged within the drying chamber and having lateral branches coiled within said passage ways; means for forcing air longitudinally through the drying chamber, and heat deflecting shields disposed vertically in the ends of said passage ways.

In testimony whereof I affix my signature in presence of two witnesses.

AMBROSE BLATCHLY.

Witnesses:
 N. A. ACKER,
 GEO. H. HOLT.